United States Patent
Isono

(10) Patent No.: US 10,408,317 B2
(45) Date of Patent: Sep. 10, 2019

(54) GEARED TRANSMISSION UNIT

(71) Applicant: TOYOTA JIDOSHA KABUSHIKI KAISHA, Toyota-shi, Aichi (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/964,649

(22) Filed: Apr. 27, 2018

(65) Prior Publication Data

US 2018/0335116 A1 Nov. 22, 2018

(30) Foreign Application Priority Data

May 19, 2017 (JP) ................................ 2017-099705

(51) Int. Cl.
| | |
|---|---|
| *F16H 37/08* | (2006.01) |
| *F16H 37/06* | (2006.01) |
| *F16H 3/72* | (2006.01) |
| *F16H 37/04* | (2006.01) |
| *F16H 1/28* | (2006.01) |

(52) U.S. Cl.
CPC ........... *F16H 37/065* (2013.01); *F16H 3/724* (2013.01); *F16H 37/0813* (2013.01); *F16H 37/0826* (2013.01); *F16H 2001/2881* (2013.01); *F16H 2037/047* (2013.01)

(58) Field of Classification Search
None
See application file for complete search history.

(56) References Cited

U.S. PATENT DOCUMENTS

| | | | | |
|---|---|---|---|---|
| 6,056,660 A | * | 5/2000 | Mimura | B60K 17/16 475/205 |
| 9,664,261 B1 | * | 5/2017 | Linton | F16H 3/724 |
| 2005/0250614 A1 | * | 11/2005 | Lumpkin | B64C 13/28 475/266 |
| 2006/0247089 A1 | * | 11/2006 | Guo | F16H 1/28 475/338 |
| 2009/0239702 A1 | * | 9/2009 | Linne | B29D 30/26 475/332 |
| 2015/0298682 A1 | * | 10/2015 | Hata | B60K 6/445 477/5 |
| 2016/0327134 A1 | * | 11/2016 | Boiger | F16H 3/727 |

FOREIGN PATENT DOCUMENTS

JP 2010-060095 A 3/2010

* cited by examiner

*Primary Examiner* — Justin Holmes
(74) *Attorney, Agent, or Firm* — Oliff PLC

(57) ABSTRACT

A geared transmission unit in which a range of a speed ratio is widened without increasing a size of the transmission unit. The geared transmission unit comprises: a first sun gear fixed to a stationary member; a second sun gear arranged coaxially with the first sun gear while being connected to the second shaft; a first pinion gear meshing with the first sun gear; a second pinion gear meshing with the first pinion gear; a third pinion gear rotated integrally with the second pinion gear; a fourth pinion gear meshing with the third pinion gear; a fifth pinion gear rotated integrally with the fourth pinion gear; and a carrier coupled to the first shaft while rotatably supporting the pinion gears.

4 Claims, 2 Drawing Sheets

GEARED TRANSMISSION UNIT

CROSS REFERENCE TO RELATED APPLICATION

The present invention claims the benefit of Japanese Patent Application No. 2017-099705 filed on May 19, 2017, with the Japanese Patent Office.

BACKGROUND

Field of the Disclosure

Embodiments of the present disclosure relate to the art of a geared transmission unit for transmitting power through a planetary gear set.

Discussion of the Related Art

An example of this kind of transmission is described in JP-A-2010-60095. The planetary gear unit taught by JP-A-2010-60095 comprises two stepped pinion gears and a carrier that supports the stepped pinion gears in a rotatable manner and that is connected to a motor. The stepped pinion gears are arranged at equal intervals on the carrier, and each of the stepped pinion gears includes a fixed planetary gear and an output planetary gear. The output planetary gear is diametrically smaller than the fixed planetary gear, and size and number of teeth are different in those gears. The planetary gear unit taught by JP-A-2010-60095 further comprises a fixed gear fixed to a stationary member coaxially with a rotational center axis of the carrier, and an output gear coupled to an output shaft. The fixed gear is diametrically larger than the fixed planetary gear, and meshed with the fixed planetary gear. The output gear is diametrically larger than the output planetary gear, and meshed with the output planetary gear. When the carrier is rotated by a torque of the motor, the fixed planetary gear meshing with the fixed gear revolves around the fixed gear, and the output planetary gear meshing with the output gear revolves around the output gear. As a result, the torque of the motor is multiplied according to a gear ratio and outputted from the output shaft.

In the transmission in which a speed ratio is governed by a plurality of gear pairs, there may be various restrictions to be downsized while increasing the speed ratio. For example, in a case of downsizing the planetary gear unit taught by JP-A-2010-60095, outer diameters of the gears have to be restricted. In this case, therefore, size and number of teeth, as well as selectable combinations of teeth numbers of the gears have to be restricted. That is, a range of speed ratio has to be restricted.

SUMMARY

Aspects of embodiments of the present disclosure have been conceived noting the foregoing technical problems, and it is therefore an object of embodiments of the present disclosure is to provide a geared transmission unit in which a range of a speed ratio is widened without increasing a size of the transmission unit.

The embodiment of the present disclosure relates to a geared transmission unit that transmits torque between a first shaft and a second shaft while amplifying or reducing the torque. In order to achieve the above-explained objective, according to the embodiment of the present disclosure, the geared transmission unit is provided with: a first sun gear that is fixed to a predetermined stationary member; a second sun gear that is arranged coaxially with the first sun gear while being connected to the second shaft in a torque transmittable manner; a first pinion gear that meshes with the first sun gear; a second pinion gear that meshes with the first pinion gear; a third pinion gear that is arranged coaxially with the second pinion gear to be rotated integrally with the second pinion gear; a fourth pinion gear that meshes with the third pinion gear; a fifth pinion gear that is arranged coaxially with the fourth pinion gear to be rotated integrally with the fourth pinion gear while meshing with the second sun gear; and a carrier that supports the first pinion gear, the second pinion gear, the third pinion gear, the fourth pinion gear, and the fifth pinion gear in a rotatable manner, and that is coupled to the first shaft in a torque transmittable manner.

In a non-limiting embodiment, the geared transmission unit may further comprise: an external gear that is formed on the carrier; and a drive gear that meshes with the external gear. The drive gear may be coupled to the first shaft.

In a non-limiting embodiment, the first shaft may include an input shaft to which the torque is applied, and the second shaft may include an output shaft that outputs the torque.

In the gear transmission unit according to the embodiment of the present disclosure, when a torque is applied to the first shaft, the carrier is rotated by the torque. Consequently, the first pinion gear revolves around the first sun gear, and the second pinion gear and the third pinion gear are rotated by the rotation of the first pinion gear. As a result, the fourth pinion gear, and the fifth pinion gear are rotated by the rotation of the third pinion gear, and the torque is outputted from the second shaft. That is, in the geared transmission unit according to the embodiment, the input speed is reduced by three steps. According to the embodiment, therefore, a ratio of the input speed to the output speed can be increased even if sizes and numbers of teeth of the gears are reduced. In other words, the geared transmission unit can be downsized while increasing a speed ratio. In addition, since the number of gears can be increased in the geared transmission unit in comparison with that in the conventional transmission, a range of a speed ratio is widened and hence the speed ratio can be set flexibly.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
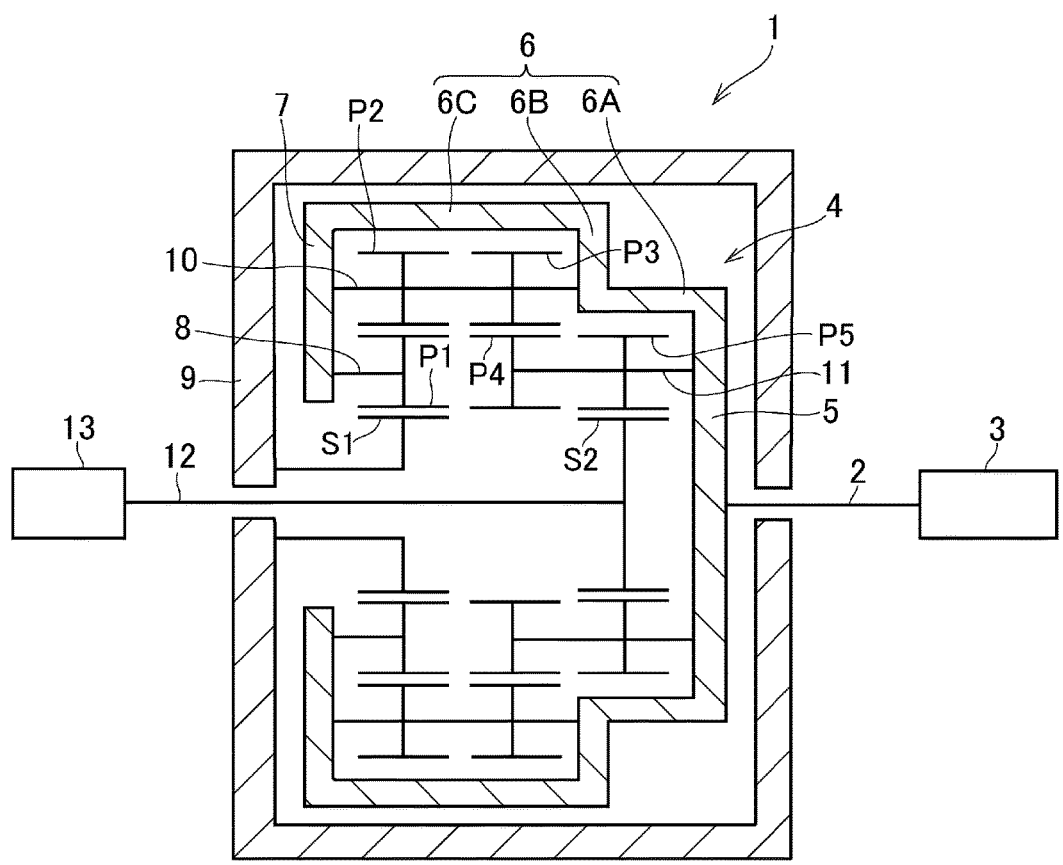
FIG. 1 is a cross-sectional view schematically showing one example of a structure of the geared transmission unit.

Preferred embodiments of the present disclosure will now be explained with reference to the accompanying drawings. Referring now to FIG. 1, there is shown one example of the geared transmission unit according to the present disclosure. A geared transmission unit 1 shown in FIG. 1 is adapted to serve as a speed reducing device. In the geared transmission unit 1, an input shaft 2 as a first shaft of the geared transmission unit 1 is connected to an actuator 3. The likes of a permanent magnet type synchronous motor or an induction motor, for example, may be adopted as the actuator 3, and the input shaft 2 is rotated by a torque of the actuator 3. A carrier 4 supporting a plurality of pinion gear is connected coaxially to the input shaft 2 so that torque of the input shaft 2 is applied to the carrier 4.

According to the example shown in FIG. 1, the carrier 4 comprises a first carrier plate 5 coupled to the input shaft 2, a cylindrical portion 6 extending from an outer circumferential portion of the carrier plate 5 in an axial direction, and a second carrier plate 7 as an annular plate formed on a leading end of the cylindrical portion 6. The cylindrical portion 6 includes a diametrically smaller portion 6A extending axially from the outer circumferential portion of the carrier plate 5, a connecting portion 6B expanding radially outwardly from a leading end of the diametrically smaller portion 6A, and a diametrically larger portion 6C extending axially from an outer circumferential portion of the connecting portion 6B. That is, the cylindrical portion 6 has a stepped portion, and the diametrically smaller portion 6A is connected to the diametrically larger portion 6C through the connecting portion 6B. The second carrier plate 7 expands radially inwardly from a leading end of the diametrically larger portion 6C.

In the carrier 4, five pinion gears P1, P2, P3, P4, and P5 as external gears are supported in a rotatable manner. Specifically, a first pinion shaft 8 extending in parallel with a rotational axis of the carrier 4 is attached to the second carrier plate 7, and the first pinion gear P1 is mounted on the first pinion shaft 8 in a rotatable manner. The first pinion gear P1 is meshed with a first sun gear S1 as an external gear that is diametrically larger than the first pinion gear P1, and is also meshed with the second pinion gear P2. The first sun gear S1 is arranged coaxially with the input shaft 2 while being fixed to a stationary member such as a case 9 holding the carrier 4. That is, the first pinion gear P1 is situated on an outer circumferential side of the first sun gear S1.

The second pinion gear P2 is situated on radially outer side of the first pinion gear P1, and the first pinion gear P1 and the second pinion gear P2 overlap each other at least partially in a circumferential direction.

Specifically, the second pinion gear P2 is supported in a rotatable manner by a second pinion shaft 10 extending parallel to the first pinion shaft 8. One of end portions of the second pinion shaft 10 is attached to the connecting portion 6B, and the other end portion of the second pinion shaft 10 is attached to the second carrier plate 7.

The third pinion gear P3 is also supported by the second pinion shaft 10 while being meshed with the fourth pinion gear P4 so that the second pinion gear P2 and the third pinion gear P3 are rotated integrally.

The fourth pinion gear P4 is situated on radially inner side of the third pinion gear P3, and the third pinion gear P3 and the fourth pinion gear P4 overlap each other at least partially in a circumferential direction. Specifically, the fourth pinion gear P4 is supported in a rotatable manner by a third pinion shaft 11 extending from the first carrier plate 5 in parallel to the input shaft 2, the first pinion shaft 8, and the second pinion shaft 10.

The fifth pinion gear P5 is also supported in a rotatable manner by the third pinion shaft 11 while being meshed with a second sun gear S2 so that the fourth pinion gear P4 and the fifth pinion gear P5 are rotated integrally. The second sun gear S2 as an external gear is diametrically larger than the fifth pinion gear P5, and mounted on one end of an output shaft 12 as a second shaft of the geared transmission unit 1 extending coaxially with the input shaft 2. The other end of the output shaft 12 is connected to an output member 13 such as a drive wheel of a vehicle. Thus, the input shaft 2, the carrier 4, the first sun gear S1, the second sun gear S2, and the output shaft 12 are aligned coaxially.

Here will be explained an action of the geared transmission unit 1. When the carrier 4 is rotated by the torque of the actuator 3, the pinion gears P1, P2, P3, P4, and P5 are rotated around the sun gears S1 and S2. In this situation, specifically, the first pinion gear P1 revolves around the first sun gear S1 while rotating. Consequently, the second pinion gear P2 is rotated by the rotation of the first pinion gear P1, and the third pinion gear P3 is rotated integrally with the second pinion gear P2. That is, the second pinion gear P2 and the third pinion gear P3 are rotated at a same speed. Consequently, the fourth pinion gear P4 is rotated by the rotation of the third pinion gear P3, and the fifth pinion gear P5 is rotated integrally with the second pinion gear P2. That is, the fourth pinion gear P4 and the fifth pinion gear P5 are also rotated at a same speed. Consequently, the second sun gear S2 is rotated by the rotation of the fifth pinion gear P5, and the output shaft 12 is rotated by the rotation of the second sun gear S2.

A speed reducing ratio of the geared transmission unit 1 can be expressed based on the teeth numbers of the sun gears S1 and S2, and the pinion gears P1, P2, P3, P4, and P5. Specifically, an output speed $N_{out}$ of the output shaft 12 can be expressed as:

$$N_{out} = N_{IN} \cdot (1 - (ZS1/ZP2) \cdot (ZP3/ZP4) \cdot (ZP5/ZS2));$$

where $N_{IN}$ is a speed of the input shaft 2, ZS1 is the teeth number of the first sun gear S1, ZP2 is the teeth number of the second pinion gear P2, ZP3 is the teeth number of the third pinion gear P3, ZP4 is the teeth number of the fourth pinion gear P4, ZP5 is the teeth number of the fifth pinion gear P5, and ZS2 is the teeth number of the second sun gear S2.

For example, given that $N_{IN}$ is 1, ZS1 is 30, ZP2 is 29, ZP3 is 30, ZP4 is 31, ZP5 is 30, and ZS2 is 30, the output speed $N_{out}$ of the output shaft 12 is:

$$N_{out} = -0.001112.$$

In this case, when the input shaft 2 and the carrier 4 are rotated by the actuator 3, the output shaft 12 is rotated 0.001112 times in an opposite direction to the input shaft 2. That is, the input torque is multiplied to be outputted. Accordingly, the speed reducing ratio γ as an inverse of $N_{out}$ is −899.

Thus, in the geared transmission unit 1 according to the embodiment, the input speed is reduced by three steps. According to the embodiment, therefore, a ratio of the input speed to the output speed can be increased even if the sizes and the numbers of teeth of the gears are reduced. In other words, the geared transmission unit 1 can be downsized while increasing a speed ratio. In addition, since a ring gear as an internal gear is not employed in the geared transmission unit 1, the geared transmission unit 1 can be structurally simplified and a manufacturing cost of the geared transmission unit 1 can be reduced. Further, in the geared transmission unit 1, the speed ratio is set by the three pairs of gears, that is, total six gears. On the other hand, in the planetary gear unit taught by JP-A-2010-60095, a speed ratio is set by four gears. In the geared transmission unit 1 according to the embodiment, therefore, a range of a speed ratio is widened and hence the speed ratio can be set flexibly.

Figure 2:
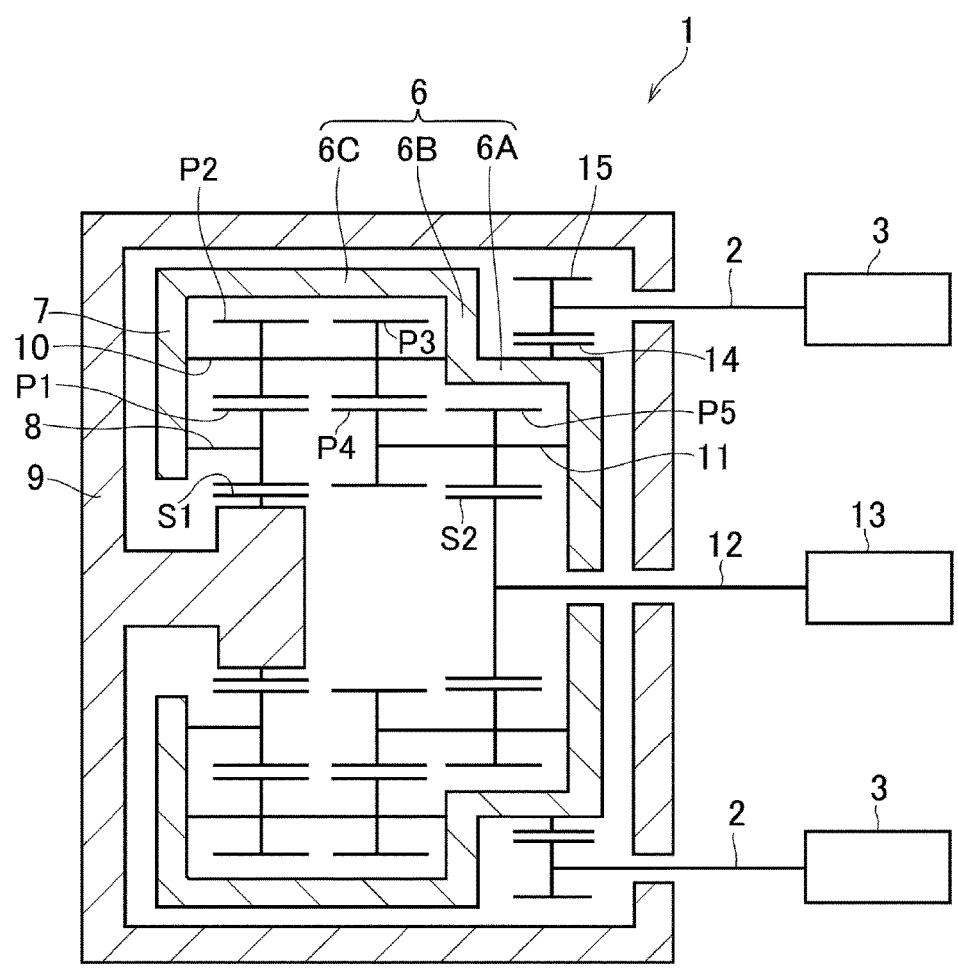
FIG. 2 is a cross-sectional view schematically showing another example of a structure of the geared transmission unit.

Turning to FIG. 2, there is shown another example of the geared transmission unit 1. In the geared transmission unit 1 shown in FIG. 2, two input shafts 2 are arranged on the same side as the output shaft 12. An external gear 14 is formed on an outer circumferential face of the diametrically smaller portion 6A of the carrier 4, and at least two drive gears 15 are meshed with the external gear 14. Each of the drive gears 15 is diametrically smaller than the external gear 14, and individually connected to the actuator 3 through the input shaft 2. In the geared transmission unit 1 shown in FIG. 2, therefore, output torques of the actuators 3 are transmitted to the carrier 4 in accordance with a gear ratio between the external gear 14 and the drive gear 15. For this reason, a torque to be generated by one of the actuators can be reduced. In other words, each of the actuators 3 can be downsized respectively. According to another example, therefore, the geared transmission unit 1 can be further downsized and a speed ratio can be further increased.

Although the above exemplary embodiments of the present disclosure have been described, it will be understood by those skilled in the art that the present disclosure should not be limited to the described exemplary embodiments, and various changes and modifications can be made within the scope of the present disclosure. For example, the geared transmission unit 1 may be modified to serve as a speed increasing device. In this case, the output shaft 12 is coupled to the carrier 4, and the input shaft 2 is coupled to the second sun gear S2. In the geared transmission unit 1 thus modified, a rotational speed of the output shaft 12 is increased higher than a rotational speed of the input shaft 2. Further, in the geared transmission unit 1 shown in FIG. 2, a brake device, a generator, or a motor-generator may be used as one of the actuator 3 to generate a braking force.

What is claimed is:

1. A geared transmission unit that transmits torque between a first shaft and a second shaft while amplifying or reducing the torque, comprising:
   a first sun gear that is fixed to a predetermined stationary member;
   a second sun gear that is arranged coaxially with the first sun gear while being connected to the second shaft in a torque transmittable manner;
   a first pinion gear that meshes with the first sun gear;
   a second pinion gear that meshes with the first pinion gear;
   a third pinion gear that is arranged coaxially with the second pinion gear to be rotated integrally with the second pinion gear;
   a fourth pinion gear that meshes with the third pinion gear;
   a fifth pinion gear that is arranged coaxially with the fourth pinion gear to be rotated integrally with the fourth pinion gear while meshing with the second sun gear; and
   a carrier that supports the first pinion gear, the second pinion gear, the third pinion gear, the fourth pinion gear, and the fifth pinion gear in a rotatable manner, and that is coupled to the first shaft in a torque transmittable manner.

2. The geared transmission unit as claimed in claim 1, further comprising:
   an external gear that is formed on the carrier; and
   a drive gear that meshes with the external gear,
   wherein the drive gear is coupled to the first shaft.

3. The geared transmission unit as claimed in claim 1, wherein the first shaft includes an input shaft to which the torque is applied, and
   wherein the second shaft includes an output shaft that outputs the torque.

4. The geared transmission unit as claimed in claim 2, wherein the first shaft includes an input shaft to which the torque is applied, and
   wherein the second shaft includes an output shaft that outputs the torque.

* * * * *